United States Patent [19]

Nutting

[11] Patent Number: 4,752,838
[45] Date of Patent: Jun. 21, 1988

[54] APPARATUS FOR REPRODUCING RECORDED INTERLEAVED VIDEO FIELDS AS A FIELD SEQUENTIAL VIDEO SIGNAL

[75] Inventor: Thomas C. Nutting, Rochester, N.Y.

[73] Assignee: Eastman Kodak Company, Rochester, N.Y.

[21] Appl. No.: 795,603

[22] Filed: Nov. 6, 1985

[51] Int. Cl.[4] .................... H04N 5/781; H04N 5/92
[52] U.S. Cl. .............................. 360/9.1; 360/33.1; 358/335
[58] Field of Search ............... 360/9.1, 33.1; 358/906, 358/909, 335, 342

[56] References Cited

U.S. PATENT DOCUMENTS

| | | | |
|---|---|---|---|
| 3,919,716 | 11/1975 | Yumde | 360/9.1 |
| 3,974,329 | 8/1976 | Zenzefilis | 360/9.1 |
| 4,133,009 | 1/1979 | Kittler et al. | 360/9.1 |
| 4,245,247 | 1/1981 | Fike et al. | 358/342 |

Primary Examiner—Alan Faber
Attorney, Agent, or Firm—David M. Woods

[57] ABSTRACT

An apparatus for reproducing recorded interleaved video fields as a field sequential video signal. The interleaved video fields are recorded on a magnetic disc at one rotary speed and reproduced at a second rotary speed utilizing appropriate switching and two dual frequency CCD delay lines to produce a field sequential video signal.

6 Claims, 2 Drawing Sheets

APPARATUS FOR REPRODUCING RECORDED INTERLEAVED VIDEO FIELDS AS A FIELD SEQUENTIAL VIDEO SIGNAL

BACKGROUND OF THE INVENTION

1. Field of the Invention

The present invention relates to apparatus for recording and reproducing video signals. More particularly, the invention relates to apparatus for reproducing recorded interleaved video fields as a field sequential video signal. (As discussed herein, "video" and "video signal" shall be taken to refer to the NTSC standard, although the invention is applicable as well to other video standards.)

2. Description Relative to the Prior Art

Conventional solid state imaging devices used in video cameras supply video information at the frame rate of 30 frames per second. Each frame is composed of two video fields apiece, each field occurring at the field rate of 60 fields per second. Such conventional solid state imaging devices produce a field sequential output by capturing the two fields ($f_1$ and $f_2$) of each frame in different successive sixtieths of a second.

While the above-described imaging devices produce satisfactory results when used in video cameras used to record motion pictures, problems occur when such devices are used to image still pictures, viz. in the event scene motion had occurred between successive fields of a still picture frame (as is likely), then the subsequent display of that still picture frame will appear less sharp. A loss in image quality occurs because a still video picture is produced by repeatedly displaying a single video frame on a video monitor, say by continuous reproduction of the recorded video frame from a magnetic recording disc. If the two fields of the displayed video frame are slightly different, the image will appear to have motion, or jitter, since the two fields may represent a moving subject in two different locations.

Efforts to overcome the aforedescribed image degradation have resulted in the use of full frame imaging devices capable of capturing both fields of the frame simultaneously. Copending patent application Ser. No. 596,890 discloses an apparatus employing a frame transfer type imaging device capable of simultaneous capture of both fields of a video frame.

The video signal produced from the disclosed apparatus is not field sequential, but instead is interleaved with lines from each of the two fields (i.e. one line from $f_1$, then one line from $f_2$, and so on). The interleaved fields must therefore be separated to produce a field sequential signal for, say, interlaced display on a video monitor. In an electronic still camera that utilizes a magnetic disc to store the video information, the separation of the interleaved fields could be accomplished prior to recording the video frame on the recording disc. This would require the use of a field store device to store one field while the other field was being recorded on the magnetic disc. Use of a field store would, however, increase the complexity and expense of the electronic camera.

The requirement for a field store could be eliminated if the interleaved video fields could be recorded directly on the magnetic disc and reproduced from the disc as a field sequential signal. The problem then, which is the basis of the present invention, is to provide an apparatus for reproducing recorded interleaved video fields as a field sequential video signal.

SUMMARY OF THE INVENTION

In accordance with the present invention, an apparatus is provided for recording interleaved video fields on a magnetic disc and reproducing the recorded interleaved video fields as a field sequential signal, doing so, by utilizing a variable speed disc drive and two dual frequency CCD delay lines.

In a presently preferred embodiment of the invention, the interleaved signal from a full frame imager is directly recorded on a magnetic disc at a first rotary speed. Field sequential reproduction is accomplished by doubling the rotary speed of the magnetic disc and utilizing appropriate switching to provide the reproduced video lines from a single field to each of the CCD delay lines. The CCD delay lines are clocked at one frequency when receiving data from the disc and a second lower frequency, compatible with standard video signals, for reading out the video line at normal video rates. While one video line is being read out from one of the CCD delay lines, the next video line is loaded into the other CCD delay line from the magnetic disc.

With the above as background, reference should now be had to the following figures for a detailed description of the invention:

FIG. 1 is a block diagram of an electronic camera incorporating the present invention, and FIG. 2 is a diagram representing the clocking cycles of the CCD delay lines.

DETAILED DESCRIPTION

Figure 1:
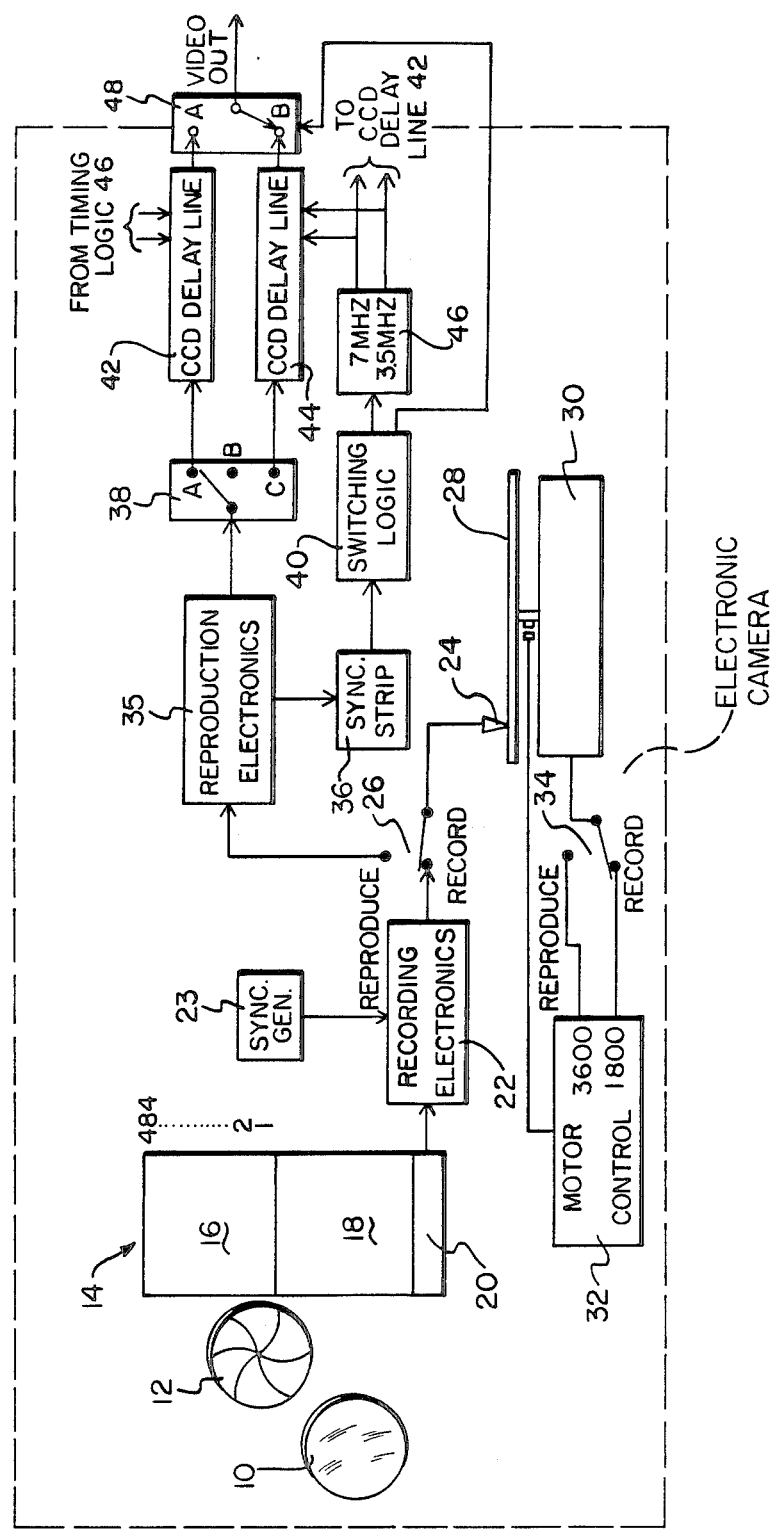

Referring to FIG. 1 of the drawings, a still image video camera is shown having a lens 10, a shutter 12 and a solid state imaging device 14. The imaging device 14 is a frame transfer type CCD imager and comprises an imaging area 16 having a two-dimensional array of photosensitive elements (pixels) arranged in 484 rows and 380 columns. The imaging area 16 is exposed, by operation of the shutter 12, to scene-radiated light for the appropriate time interval. Each pixel in the imaging area 16 now contains a photocharge that is proportional to the magnitude of light incident on the pixel. The rows of photocharge are shifted to a storage register 18 by the appropriate clocking signals and subsequently read out from the storage register 18 through the use of a horizontal CCD shift register 20.

The 484 rows of the imager represent the active image area of a full video frame, the odd rows representing the video lines of the first field of the video frame and the even rows representing the video lines of the second video field. Because the rows are read from the imager sequentially (i.e. row 1, then 2, 3 . . . ) the output signal from the imager is interleaved with video lines from the first and second fields instead of being field sequential.

The output signal from the register 20 is provided to recording electronics 22. The recording electronics 22 combine the output signal from the register 20 with line synchronization pulses from a sync generator 23 before supplying the composite signal to a record/playback head 24 when a switch 26 is in the record position. The interleaved video fields are thereby recorded on a disc 28.

The rotation of the disc 28 is controlled by a motor 30 and a motor control circuit 32. When a switch 34 is in the record position, the rotary speed of the disc 28 is maintained at 1800 RPM. The 484 video lines are stored on one track of the recording disc 28 during one revolution of the disc.

To reproduce the recorded interleaved video information as a field sequential video signal, switches 26 and 34 are switched to the reproduce mode. The motor control circuit 32 now controls the motor 30 so that the rotary speed of the recording disc 28 is maintained at 3600 RPM and the output from the record/playback head 24 is provided to reproduction electronics 35.

The output signal from the reproduction electronics 35 is provided to a sync stripper 36 which supplies the line synchronization pulses to switching logic 40. The line synchronization pulses are used by the switching logic 40 to switch the switching device 38 output from among the input to the CCD delay line 42, a null position for the switching device 38 and the input to the CCD delay line 44. The switching logic 40 also controls the operation of timing logic 46 that supplies the clocking signals to the CCD delay lines 42 and 44. The CCD delay lines 42 and 44 are dual frequency delay lines, i.e. information is clocked in at one data rate and clocked out at a second data rate.

Figure 2:
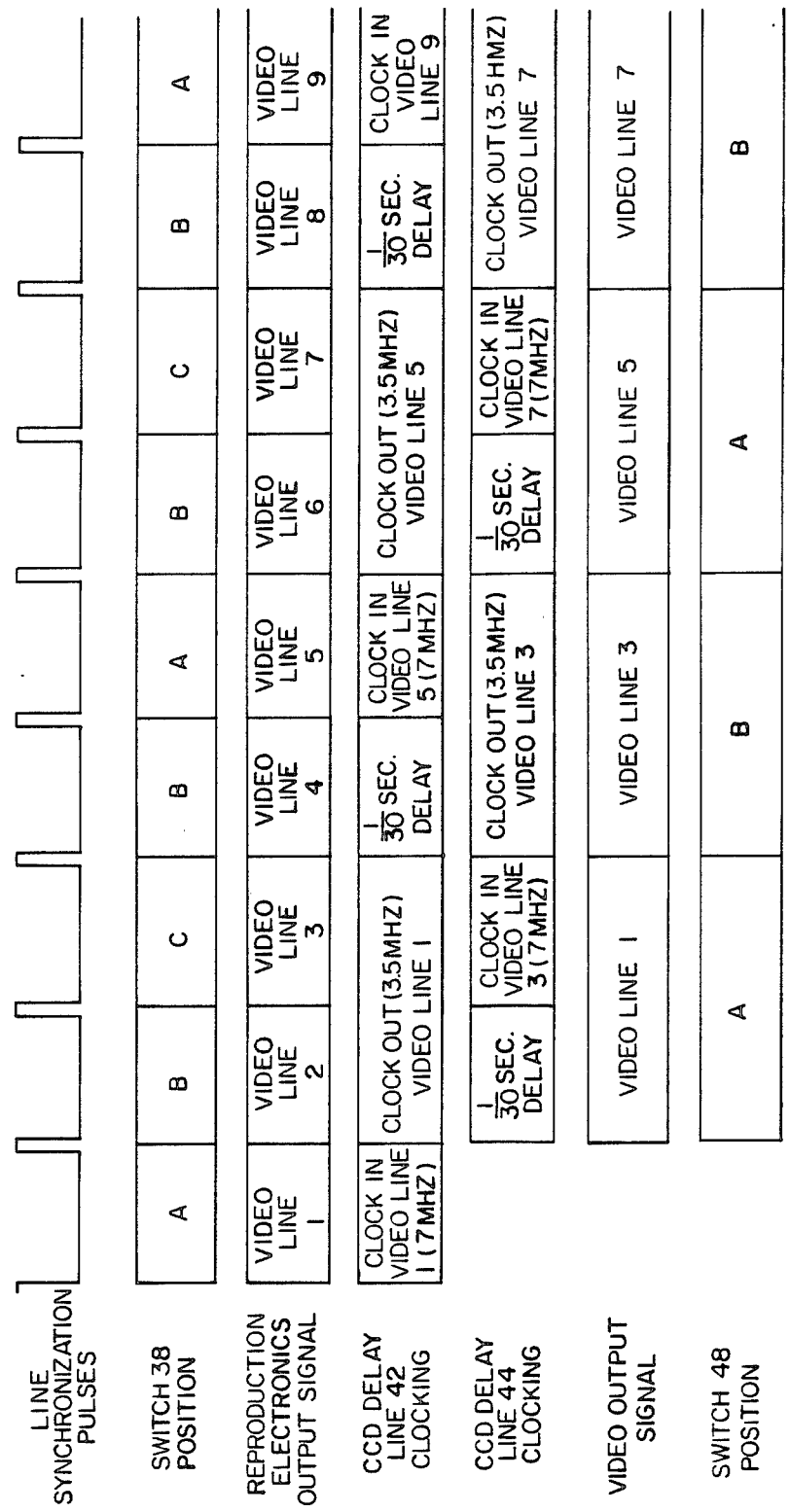

The separation of the interleaved video fields will be discussed with reference to FIG. 2. In order to obtain field 1 (the odd video lines) switching device 38 is placed in position A. The first video line (line 1) is then clocked into the CCD delay line 42 in a time of one line in 63.5 μsec./2 (or 31.75 μsec). The switching device 38 is then switched to position B, the null position, and switching device 48 is placed in position A by switching logic 40 and the CCD delay line 42 is clocked out at normal video rate of one line in 63.5 μsec.

The switching device 38 is left in the null position for a period of 31.75 μsec. so that video line 2 is "skipped" and not shifted into either of the CCD delay lines 42 or 44. Midway during the period when line 1 is clocked from the CCD delay line 42, the device 38 is then switched to position C, causing video line 3 to be clocked into the CCD delay line 44 in a time of 31.75 μsec. The device 38 is again switched to the null position B, device 48 is switched to position B, during which time video line 3 is clocked out of the CCD delay line 44 at the normal video rate of one line in 63.5 μsec. As can be seen in FIG. 2 the video output signal consists of all the odd video lines i.e. the first video field. The second video field is then generated in a similar manner by reproducing the even video lines. The video output signal generated is, therefore, field sequential.

The invention has been described in detail with particular reference to obtain preferred embodiments thereof, but it will be understood that variations and modifications can be effected within the spirit and scope of the invention.

What is claimed is:

1. Apparatus for converting a signal representing an interleaved sequence of odd and even video lines corresponding to interleaved video fields into a field sequential video signal, said fields being stored on an information storage disc that had been recorded at a first disc rotary speed, said apparatus comprising:
   (a) means for rotating said information storage disc at a rotary speed approximately twice the speed at which said disc was recorded,
   (b) reproducing means for reproducing the video information stored on said disc during each rotation of said disc,
   (c) first and second dealy means for alternately receiving information from said reproducing means at one data rate and reading out the information at a second data rate, and
   (d) switching means coupled to said reproducing means and to said first and second delay means for selectively switching either the odd line or even line portion of the video information from said reproducing means to said first and second delay means, whereby the video information from said first and second delay means may be formed into a field sequential video signal.

2. Apparatus for recording and reproducing interleaved lines of video information on an information storage disc, said apparatus comprising:
   (a) means for selectively rotating said disc at a first and a second rotary speed,
   (b) means for recording video information on said disc while said disc is rotating at said first rotary speed,
   (c) reproducing means for reproducing the video information recorded on said disc while said disc is rotating at said second rotary speed,
   (d) first and second delay means coupled to said reproducing means for alternately processing an uninterleaved portion of the video information from said reproducing means at one data rate and reading out the video information at a second data rate, and
   (e) adder means for combining the video information read out from said first and second delay means to produce a field sequential video signal.

3. The apparatus as claimed in claim 2 further comprising means for clocking said first and second delay means at said first and second data rates.

4. The apparatus as claimed in claim 3 wherein said first data rate is substantially twice the video frequency of a standard video signal and said second data rate is substantially equal to the video frequency of a standard video signal.

5. An electronic camera for recording electronically interleaved video information on an information storage disc, said video information representing an interleaved sequence of odd and even video lines corresponding to interleaved video fields, said camera comprising:
   (a) means for rotating said information storage disc at a first and a second rotary speed,
   (b) recording means for recording video information on said information storage disc while said disc is rotating at said first rotary speed,
   (c) reproducing means for reproducing the video information stored on said storage disc while said disc is rotating at said second rotary speed,
   (d) first and second delay means for alternately receiving a portion of the video information reproduced from said reproducing means at one data rate and reading out said information at a second data rate,
   (e) switching means coupled to said reproducing means and to said first and second delay means for selectively switching either the odd line or even line portion of said video information reproduced by said reproducing means to said first and second delay means, and
   (f) timing means for clocking said first and second delay means at said first and second data rates.

6. Method of reproducing interleaved video fields recorded on an information storage disc to generate a field sequential video signal therefrom, said method comprising the steps of:

(a) rotating said storage disc at approximately twice the rotary speed at which said interleaved fields were recorded, (b) reproducing said interleaved video fields from said information storage disc, (c) transferring a first line portion of a reproduced, interleaved video field into a first delay line at a first data rate and therefrom at a second data rate, (d) transferring a second line portion of said interleaved video field into a second delay line at said first data rate and therefrom at said second data rate, and (e) combining the first and second portions of the reproducing video field transferred by said first and second delay means to produce a field sequential video signal.

* * * * *